May 3, 1949.　　　　A. G. EGGERS　　　　2,469,262
LATHE WITH VARIABLE SPEED CARRIAGE FEED
Filed June 11, 1948　　　　　　　　　　2 Sheets-Sheet 1

INVENTOR.
ALFRED G. EGGERS.
BY
Brown, Critchlow, Flick & Peckham
his
ATTORNEYS.

May 3, 1949. A. G. EGGERS 2,469,262
LATHE WITH VARIABLE SPEED CARRIAGE FEED
Filed June 11, 1948 2 Sheets-Sheet 2
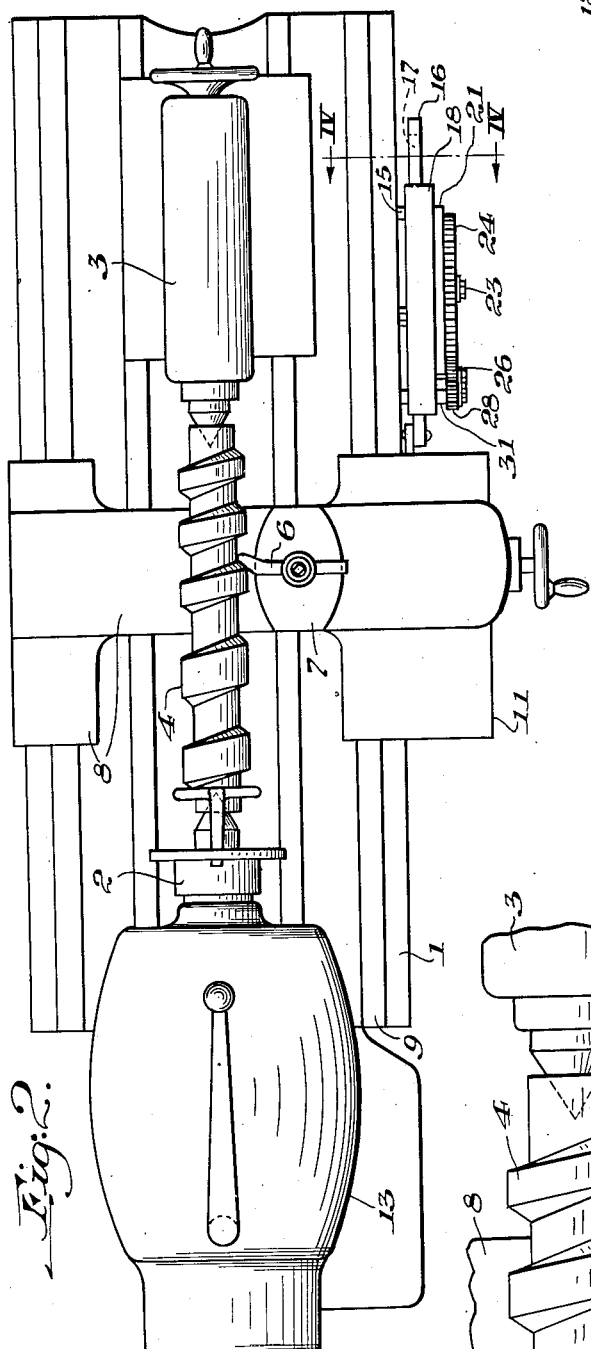
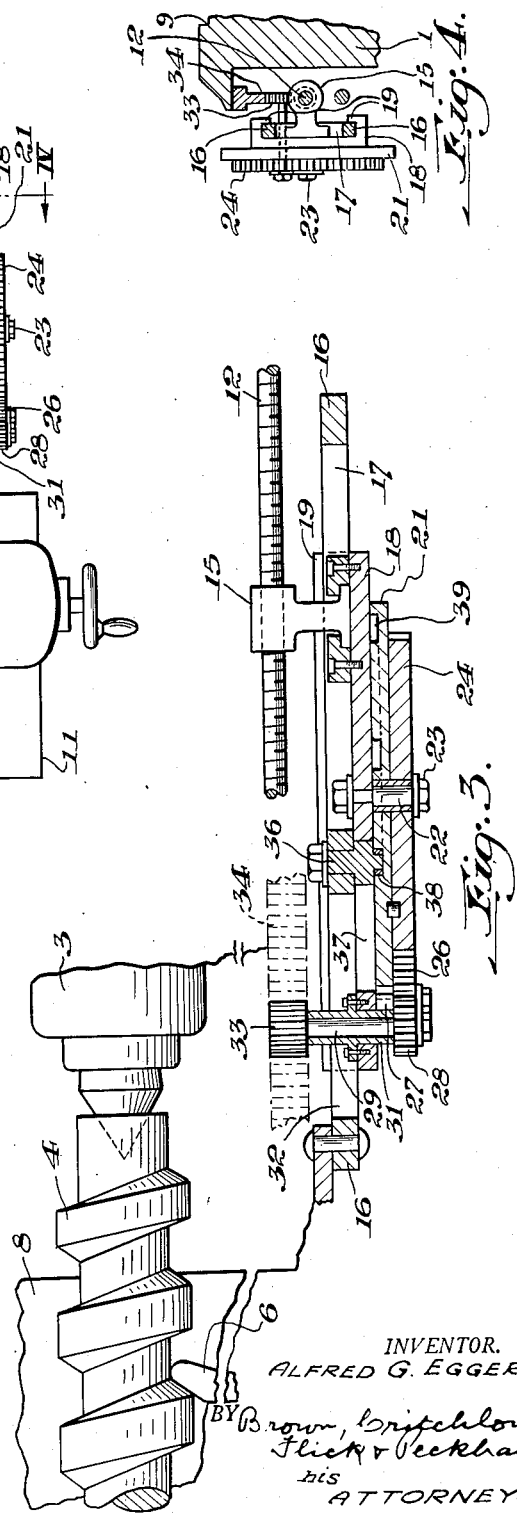
INVENTOR.
ALFRED G. EGGERS.
BY Brown, Critchlow,
Flick & Peckham
his
ATTORNEYS.

Patented May 3, 1949

2,469,262

UNITED STATES PATENT OFFICE 2,469,262

LATHE WITH VARIABLE SPEED CARRIAGE FEED

Alfred G. Eggers, Pittsburgh, Pa., assignor to Horix Manufacturing Company, Pittsburgh, Pa., a corporation of Pennsylvania Application June 11, 1948, Serial No. 32,337

10 Claims. (Cl. 82—5)

This invention relates to turning lathes, and more particularly to apparatus for controlling the rate of carriage feed relative to the rotation of the work-piece.

It is among the objects of this invention to provide a lathe in which the tool-supporting carriage that moves lengthwise of the machine can be advanced at a varying rate of speed relative to a uniformly rotating work-piece, and to provide for accomplishing this in conventional lathes by making a relatively inexpensive change.

Most of the lathe is conventional. It includes a tool holder mounted on a carriage that is slidable lengthwise of the lathe bed, and means for rotating a head stock and the usual feed screw that moves the carriage. However, in accordance with this invention, the feed nut which is mounted on the screw is not connected directly to the carriage, but is connected with a rotatable cam which it moves bodily along the machine independently of the carriage. The cam is operatively connected with the carriage so that as the cam is turned at any given rate it will move the carriage ahead at a speed determined by the shape of the cam. This speed is different from the uniform speed at which the nut is moved ahead by the screw. The cam is turned, as it is moved ahead by the nut, by means of gear teeth also advancing with the nut; the teeth meshing with a stationary rack that is parallel to the screw. Preferably, the cam is supported by a slide that connects it to the nut, and the cam engages a roller mounted on an arm projecting from the carriage. The cam may be provided with teeth that engage the rack, or the cam can be rotated through intermediate gears carried by the slide. In any case, the nut moves ahead at a constant speed relative to the rotation of the head stock, but the speed of the carriage is determined by the gearing and the shape of the cam.

Figure 1:
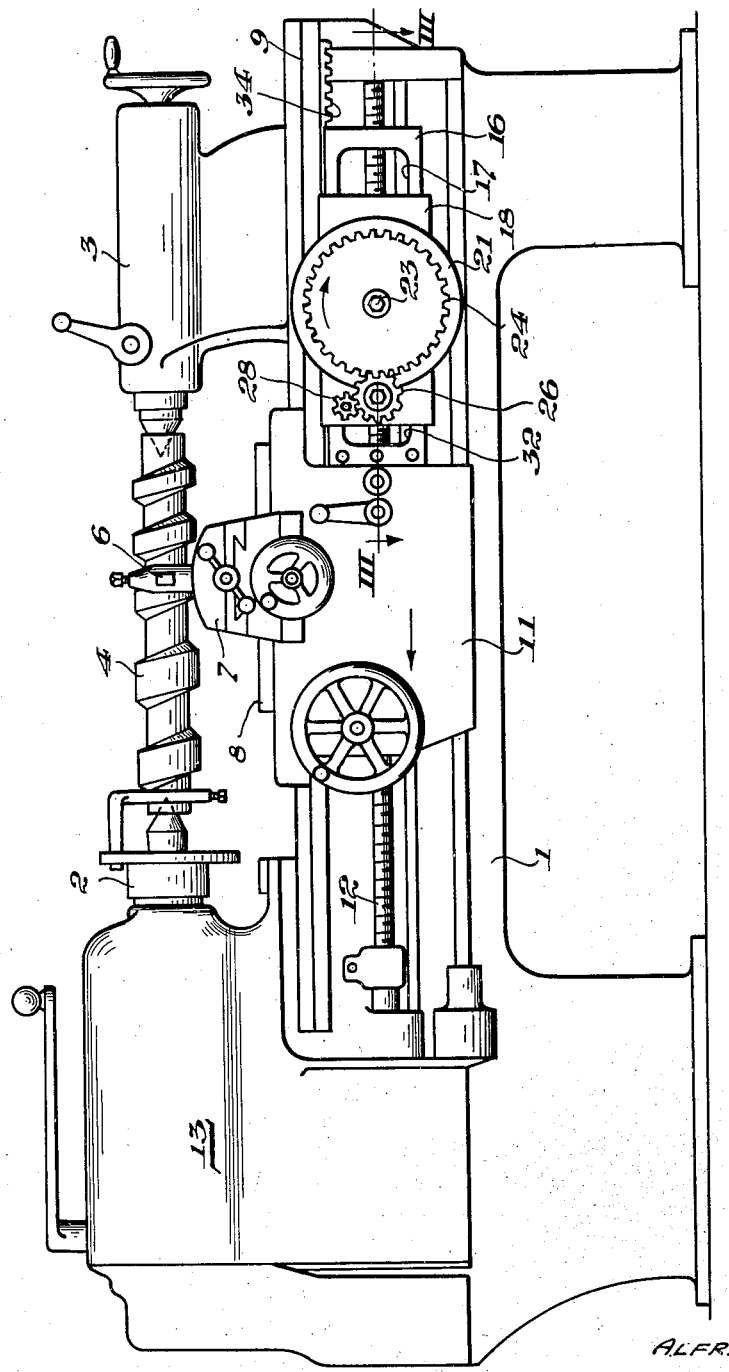
Figure 5:
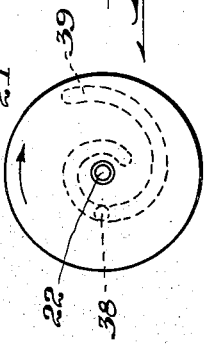

The preferred embodiment of the invention is illustrated in the accompanying drawings in which Fig. 1 is a side view of my lathe; Fig. 2 is a plan view of it; Fig. 3 is an enlarged fragmentary horizontal section taken on the line III—III of Fig. 1; Fig. 4 is a vertical section taken on the line IV—IV of Fig. 2; and Fig. 5 is a view of the cam showing in dotted lines the position of the cam groove at the moment the cam is in the location shown in the other figures.

Referring to Figs. 1 and 2 of the drawings, a lathe bed 1 supports a head stock 2 at its front end and an adjustable tail stock at the other end 3. A work-piece 4 being cut or turned is supported in the usual manner by the two stocks. The turning of the work-piece is accomplished by a cutting tool 6 clamped in a support 7 mounted on a carriage 8 that is slidable lengthwise of the bed on ways 9. The carriage includes the usual apron 11 that extends down one side of the machine and supports a number of controls. Extending horizontally through or past the apron is the usual feed screw 12 that is journaled in opposite ends of the bed. The front end of the screw extends into a housing 13 where it is connected by the usual gears (not shown) with the head stock so that as the head stock is rotated by a motor in the housing the screw likewise will be rotated at a speed determined by the gearing that connects them. The screw and head stock are driven at constant speeds, but one can be driven faster or slower than the other, as is well known.

It is a feature of this invention that the carriage can be advanced at a varying rate of speed independent of the rate of rotation of the feed screw, whereby a variable pitch thread or flight can be turned on the work-piece. Accordingly, the carriage apron is not provided with the usual feed nut engaging the feed screw, but, instead, the feed nut 15 is mounted on the screw near one end, preferably near the tail stock. Rigidly connected to the adjacent end of the carriage apron is a plate-like arm 16 that extends back past the nut. The rear end portion of the arm is provided with an opening 17 through which the nut extends. This opening is long enough to permit the nut and arm to move lengthwise of each other the necessary amount, as will be seen later. The outer face of the nut is clamped rigidly to the inner surface of a plate-like slide 18 which has inwardly extending upper and lower flanges 19 that fit over the upper and lower edges of the arm by which the slide is slidably supported and guided.

A disk cam 21 is connected with the nut so that it will move with the nut. This is done by rotatably mounting the cam against the outerface of the slide on a stub shaft 22 which is rigidly mounted in the slide, as shown in Fig. 3. A removable screw 23 at the outer end of the shaft permits the cam to be removed. Rigidly connected to the outer face of the cam in any suitable manner is a large gear 24 which meshes with a smaller gear 26 detachably mounted on another stub shaft 27 secured to the slide in front of the cam. The smaller gear is driven by a still smaller one 28 removably mounted on one end of a shaft 29 that extends through a long bushing 31 projecting from opposite sides of the slide. The inner end of this bushing extends through an opening 32 in the front portion of the arm. This opening is long enough to permit as much movement between the bushing and arm as is permitted by opening 17. On the inner end of shaft 29 there is a gear 33 that meshes with a horizontal rack 34 rigidly mounted in the lathe bed above the feed screw. Consequently, when the nut and slide are moved ahead by the feed screw, the gears will be rotated by the stationary rack and therefore will cause the cam to rotate at a speed determined by the gear ratios. Of course, the large gear could be omitted by providing the cam with gear teeth, and the three smaller gears could be omitted by placing the rack above the large gear or toothed cam in direct engagement with it. The arrangement shown is preferred, however, because it allows for more flexibility, in that the gears can be changed as well as the cam.

For operatively connecting the cam to the carriage, a stud 36 is secured in the central portion of arm 16 between openings 17 and 32, and projects through a horizontal slot 37 in the slide in front of the cam shaft 22. The outer end of this stud carries a roller 38 which rides in a cam groove 39 cut in the inner surface of the cam. It will be seen that as the cam is rotated by the gears, the roller is advanced by it at a different rate than the feed nut and slide. The rate depends on the shape of the cam groove. The particular cam shown is designed to accelerate the roller as it moves to the left. As the roller is mounted on the arm and the arm is secured to the carriage, the carriage likewise is advanced at a speed differing from that of the slide. The speed of the carriage therefore may be controlled so that it is either faster or slower than the slide movement, or it may be varied, sometimes being faster and sometimes slower than the slide. In this way a thread of any desired contour can be cut on the work-piece which rotates at a uniform speed.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A lathe comprising a bed, a carriage slidable lengthwise thereof, a tool holder mounted on the carriage, a head stock and a tail stock mounted on the bed, a feed screw extending lengthwise of the bed, means for rotating the head stock and screw, a feed nut mounted on the screw, a rotatable cam, means connecting the cam with the nut for movement therewith, a stationary rack parallel to the screw, gear teeth movable with the nut and meshing with the rack for turning the cam while the nut is being moved ahead by the feed screw, and means operatively connecting the cam with the carriage so that as the cam is turned it will move the carriage ahead at a different speed than the nut is moved ahead.

2. A lathe comprising a bed, a carriage slidable lengthwise thereof, a tool holder mounted on the carriage, a head stock and a tail stock mounted on the bed, a feed screw extending lengthwise of the bed, means for rotating the head stock and screw, a feed nut mounted on the screw, a rotatable cam, means connecting the cam with the nut for movement therewith, a stationary rack parallel to the screw, gear teeth movable with the nut and meshing with the rack for turning the cam while the nut is being moved ahead by the feed screw, a cam follower roller, and means connecting the roller with the carriage, the roller engaging the cam for moving the carriage as the cam is turned, whereby the carriage speed can be controlled independently of the screw speed.

3. A lathe comprising a bed, a carriage slidable lengthwise thereof, a tool holder mounted on the carriage, a head stock and a tail stock mounted on the bed, a feed screw extending lengthwise of the bed, means for rotating the head stock and screw, a feed nut mounted on the screw, a slide rigidly connected to the nut, a cam rotatably mounted on the slide, a stationary rack parallel to the screw, gear teeth movable with the slide and meshing with the rack for turning the cam while the slide is being moved ahead by the feed screw, and means operatively connecting the cam with the carriage so that as the cam is turned it will advance the carriage at a different speed than the slide is advanced.

4. A lathe comprising a bed, a carriage slidable lengthwise thereof, a tool holder mounted on the carriage, a head stock and a tail stock mounted on the bed, a feed screw extending lengthwise of the bed, means for rotating the head stock and screw, a feed nut mounted on the screw, a rotatable cam, means connecting the cam with the nut for movement therewith, a stationary rack parallel to the screw, gear teeth movable with the nut and meshing with the rack for turning the cam while the nut is being moved ahead by the feed screw, an arm projecting from the carriage adjacent the cam, and a cam follower roller rotatably mounted on the arm for moving the arm ahead as the cam is turned, whereby the carriage speed can be controlled independently of the screw speed.

5. A lathe comprising a bed, a carriage slidable lengthwise thereof, a tool holder mounted on the carriage, a head stock and a tail stock mounted on the bed, a feed screw extending lengthwise of the bed, means for rotating the head stock and screw, a feed nut mounted on the screw, a slide rigidly connected to the nut, a cam rotatably mounted on the slide, a stationary rack parallel to the screw, gear teeth movable with the slide and meshing with the rack for turning the cam while the slide is being moved ahead by the feed screw, an arm rigidly connected to the carriage and extending along the slide, and a roller rotatably mounted on the arm and engaging the cam for advancing the carriage at a different speed than the slide is advanced.

6. A lathe comprising a bed, a carriage slidable lengthwise thereof, a tool holder mounted on the carriage, a head stock and a tail stock mounted on the bed, a feed screw extending lengthwise of the bed, means for rotating the head stock and screw, a feed nut mounted on the screw, a rotatable disc parallel to the screw and provided with a cam groove, means connecting the disc with the nut for movement therewith, a stationary rack parallel to the screw, gear teeth movable with the nut and meshing with the rack for turning the disc while the nut is being advanced by the feed screw, a cam follower roller disposed in said cam groove, and means connecting the roller with the carriage, whereby the carriage is moved ahead at a different speed than the nut is advanced.

7. A lathe comprising a bed, a carriage slidable lengthwise thereof, a tool holder mounted on the carriage, a head stock and a tail stock mounted on the bed, a feed extending lengthwise of the bed, means for rotating the head stock and screw, a feed nut mounted on the screw, a slide rigidly connected to the nut, a cam rotatably mounted on the slide, a stationary rack parallel to the screw, gears rotatably mounted on the slide and meshing with the rack for turning the cam while the slide is being moved ahead by the feed screw, and means operatively connecting the cam with the carriage so that as the cam is turned it will advance the carriage at a different speed than the slide is advanced.

8. A lathe comprising a bed, a carriage slidable lengthwise thereof, a tool holder mounted on the carriage, a head stock and a tail stock mounted on the bed, a feed screw extending lengthwise of the bed, means for rotating the head stock and screw, a feed nut mounted on the screw, a slide rigidly connected to the nut, a cam rotatably mounted on the slide, a stationary rack parallel to the screw, gear teeth movable with the slide and meshing with the rack for tuning the cam while the slide is being moved ahead by the feed screw, an arm rigidly connected to the carriage and slidably supporting the slide, and a roller rotatably mounted on the arm and engaging the cam for advancing the carriage at a different speed than the slide is advanced.

9. A lathe comprising a bed, a carriage slidable lengthwise thereof, a tool holder mounted on the carriage, a head stock and a tail stock mounted on the bed, a feed screw extending lengthwise of the bed, means for rotating the head stock and screw, a feed nut mounted on the screw, a slide rigidly connected to the nut, a cam rotatably mounted on the side of the slide opposite to the nut, an arm disposed on the other side of the slide and rigidly connected to the carriage, the arm slidably supporting the slide and provided with an opening in which said nut can move lengthwise of the arm, a stationary rack parallel to the screw, gear teeth movable with the slide and meshing with the rack for tuning the cam while the slide is moved ahead by the feed screw, and means operatively connecting the cam with said arm so that as the cam is turned it will advance the carriage at a different speed than the slide is advanced.

10. A lathe comprising a bed, a carriage slidable lengthwise thereof, a tool holder mounted on the carriage, a head stock and a tail stock mounted on the bed, a feed screw extending lengthwise of the bed, means for rotating the head stock and screw, a feed nut mounted on the screw, a slide rigidly connected to the nut, a cam rotatably mounted on the side of the slide opposite to the nut, an arm disposed on the other side of the slide and rigidly connected to the carriage, the arm slidably supporting the slide and provided with an opening in which said nut can move lengthwise of the arm, a stationary rack parallel to the screw and adjacent to it, a shaft journaled in the slide, the arm being provided with a slot through which the shaft extends, gears on the opposite ends of the shaft, one of the gears meshing with the rack, gearing meshing with the other gear for turning the cam, the slide being provided with a longitudinal slot, and a cam follower roller rotatably mounted on the arm and extending through said slide slot and into engagement with the cam.

ALFRED G. EGGERS.

REFERENCES CITED

The following references are of record in the file of this patent:

UNITED STATES PATENTS

| Number | Name | Date |
| --- | --- | --- |
| 550,439 | Childs | Nov. 26, 1895 |
| 1,347,789 | Muller | July 27, 1920 |
| 1,630,716 | Pierce | May 31, 1927 |
| 1,799,038 | Cherry | Mar. 31, 1931 |

FOREIGN PATENTS

| Number | Country | Date |
| --- | --- | --- |
| 1,065 | Great Britain | 1886 |
| 17,077 | Great Britain | 1909 |
| 583,485 | France | Jan. 13, 1925 |